United States Patent
Abileah et al.

(10) Patent No.: US 11,146,780 B1
(45) Date of Patent: Oct. 12, 2021

(54) ARTIFICIAL WINDOW WITH PARALLAX EFFECT

(71) Applicant: a.u. Vista, Inc., Irvine, CA (US)

(72) Inventors: Adiel Abileah, Irvine, CA (US);
Willem den Boer, Irvine, CA (US);
Seok-Lyul Lee, Hsinchu (TW);
Fang-Chen Luo, Irvine, CA (US); Tai Kang Wu, Hsinchu (TW)

(73) Assignee: A.U. VISTA, INC., Irvine, CA (US)

( * ) Notice: Subject to any disclaimer, the term of this patent is extended or adjusted under 35 U.S.C. 154(b) by 0 days.

(21) Appl. No.: 16/921,848

(22) Filed: Jul. 6, 2020

(51) Int. Cl.
| | |
|---|---|
| H04N 7/18 | (2006.01) |
| H04N 13/383 | (2018.01) |
| G06T 7/70 | (2017.01) |
| G06K 9/00 | (2006.01) |
| H04N 13/305 | (2018.01) |
| G02F 1/1362 | (2006.01) |
| G02B 30/27 | (2020.01) |

(52) U.S. Cl.
CPC ....... *H04N 13/383* (2018.05); *G06K 9/00597* (2013.01); *G06T 7/70* (2017.01); *H04N 13/305* (2018.05); *G02B 30/27* (2020.01); *G02F 1/1362* (2013.01); *G06T 2207/30201* (2013.01)

(58) Field of Classification Search
CPC ............... H04N 13/383; H04N 13/305; G06K 9/00597; G06T 7/70; G06T 2207/30201; G02B 30/27; G02F 1/1362
USPC .......................................................... 348/59
See application file for complete search history.

(56) References Cited

U.S. PATENT DOCUMENTS

| | | | |
|---|---|---|---|
| 9,509,939 B2 * | 11/2016 | Henion ................ | A63G 31/00 |
| 10,136,125 B2 | 11/2018 | Yoon et al. | |
| 2002/0198438 A1 * | 12/2002 | Cromer ................ | A61M 21/02 |
| | | | 600/27 |

(Continued)

FOREIGN PATENT DOCUMENTS

| | | |
|---|---|---|
| CN | 107402453 A | 11/2017 |
| JP | 2018136525 A | 8/2018 |
| WO | 2015078161 A1 | 6/2015 |

OTHER PUBLICATIONS

Guo et al, Wide viewing angle of twist nematic liquid cyrstal in polymer networks (Year: 1995).*

(Continued)

*Primary Examiner* — Shan E Elahi
(74) *Attorney, Agent, or Firm* — Tim Tingkang Xia, Esq.; Locke Lord LLP

(57) ABSTRACT

An artificial window is provided. The artificial window includes a window having a frame, and a display device disposed at a back side of the window. The display device is used to display images. An image capturing device may be disposed on the window to obtain a viewer image of a viewer. Thus, a viewing direction of the viewer may be determined based on the viewer image, and the images being displayed on the display device may be changed based on the location of the viewer. The display device may be a curved display device, which is wider than the frame. Alternatively, the display device may be a flat display device, and a lenticular array formed by lenticular lenses is disposed between the window and the flat display device. Each of the lenticular lenses is focused on or close to a display surface of the flat display device.

13 Claims, 8 Drawing Sheets

(56) References Cited

U.S. PATENT DOCUMENTS

| | | | |
|---|---|---|---|
| 2005/0280706 A1* | 12/2005 | Jong | G09F 19/22 348/143 |
| 2008/0001910 A1* | 1/2008 | Lim | G09G 3/3406 345/102 |
| 2012/0069259 A1* | 3/2012 | Oh | G02F 1/13338 349/43 |
| 2012/0113097 A1 | 5/2012 | Nam et al. | |
| 2014/0002351 A1 | 1/2014 | Nakayama | |
| 2014/0133022 A1 | 5/2014 | Kim et al. | |
| 2017/0211764 A1* | 7/2017 | Price | F21S 8/006 |
| 2018/0068170 A1* | 3/2018 | Kohlmeier-Beckmann | G09G 5/14 |
| 2018/0131914 A1* | 5/2018 | Sporn | H04N 9/3185 |
| 2018/0367751 A1* | 12/2018 | Devendran | H04N 5/225 |
| 2019/0045176 A1 | 2/2019 | Ratcliff et al. | |
| 2019/0058918 A1* | 2/2019 | Itzkowitz | H04N 21/44218 |

OTHER PUBLICATIONS

Sarcona et al, Low temperature silicides for thin film transistor applications in active-matrix liquid crystal display technology (Year: 1995).*

Office Action issued by (TIPO) Intellectual Property Office Ministry of Economic Affairs R.O.C. dated Aug. 4, 2021 for Application No. 110103881, Tawian.

* cited by examiner

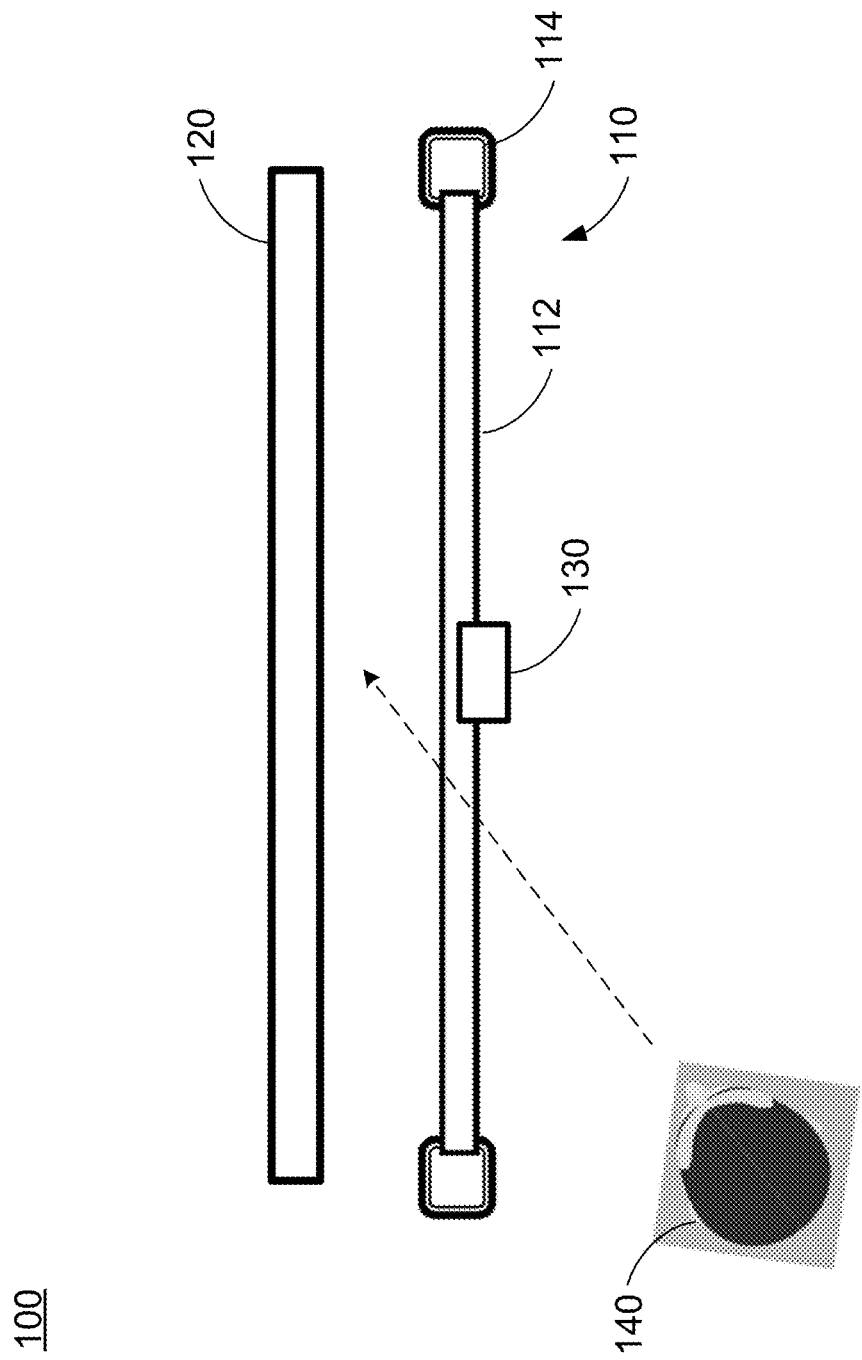

ARTIFICIAL WINDOW WITH PARALLAX EFFECT

FIELD

The disclosure relates generally to display technology, and more particularly to an artificial window.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Recent houses in dense cities have limited windows with views. Therefore, there is a need for an artificial window, which enhances living and work environments by providing attractive real-world scenery in locations where a real window is not feasible or desirable. However, the existing artificial window does not really look realistic.

Therefore, a heretofore unaddressed need exists in the art to address the aforementioned deficiencies and inadequacies.

SUMMARY

One aspect of the disclosure relates to an artificial window, which includes: a window having a frame; a display device disposed at a back side of the window, configured to display a plurality of images; and an image capturing device disposed on the window to obtain a viewer image of a viewer, wherein a viewing direction of the viewer is determined based on the viewer image, and the images being displayed on the display device are changed based on the viewing direction of the viewer by identifying eyes of the viewer in the viewer image.

In certain embodiments, the window comprises at least one transparent panel being framed in the frame.

In certain embodiments, the image capturing device is a camera disposed on a top middle location on the frame.

In certain embodiments, the viewing direction of the viewer is determined by: obtaining the viewer image by the image capturing device; identifying a location of the viewer in the viewer image; identifying eyes of the viewer in the viewer image, and defining a middle point between the eyes of the viewer; and determining the viewing direction of the viewer based on the location of the viewer and the middle point.

In certain embodiments, the artificial window further includes a frame adjustment device, the frame is detachably movable relative to the window, and the frame adjustment device is configured to adjust a three-dimensional (3D) position of the frame relative to the window based on a location of the viewer.

In certain embodiments, the 3D position of the frame is adjusted by: obtaining the viewer image by the image capturing device; identifying the location of the viewer in the viewer image; determining a new 3D position of the frame relative to the window based on the location of the viewer; and moving the frame from a current position to the new 3D position by the frame adjustment device.

Another aspect of the disclosure relates to an artificial window, which includes: a window having a frame; and a curved display device disposed at a back side of the window, configured to display a fixed image, wherein the curved display device is wider than the frame.

In certain embodiments, the window comprises at least one transparent panel being framed in the frame.

In certain embodiments, the artificial window further includes a plurality of lenslets arranged in an array and disposed between the window and the curved display device, wherein each of the lenslets is focused on or close to a display surface of the curved display device.

In certain embodiments, the artificial window further includes an image capturing device disposed on the window to obtain a viewer image of a viewer, wherein a location of the viewer is determined based on the viewer image, and the frame is detachably movable relative to the window; and a frame adjustment device, configured to adjust a three-dimensional (3D) position of the frame relative to the window based on the location of the viewer.

In certain embodiments, the 3D position of the frame is adjusted by: obtaining the viewer image by the image capturing device; identifying the location of the viewer in the viewer image; determining a new 3D position of the frame relative to the window based on the location of the viewer; and moving the frame from a current position to the new 3D position by the frame adjustment device.

In a further aspect of the disclosure, an artificial window includes: a window having a frame; a flat display device disposed at a back side of the window, configured to display a plurality of images; and a lenticular array formed by a plurality of lenticular lenses disposed between the window and the flat display device, wherein each of the lenticular lenses is focused on or close to a display surface of the flat display device.

In certain embodiments, the window comprises at least one transparent panel being framed in the frame.

In certain embodiments, the flat display device is a multi-view stereoscopic display device, and information of the images being displayed on the flat display device matches a structure of the lenticular array.

In certain embodiments, the flat display device is a light-field three-dimensional (3D) display device, and the images being displayed by the flat display device are 3D images.

In certain embodiments, the light-field 3D display device has a plurality of pixels in a plurality of viewing directions, and a backlight module illuminating the pixels in each of the viewing directions.

In certain embodiments, the light-field 3D display device is an active-matrix liquid crystal display (AMLCD) device.

In certain embodiments, the artificial window further includes an image capturing device disposed on the window to obtain a viewer image of a viewer, wherein a location of the viewer is determined based on the viewer image, and the frame is detachably movable relative to the window; and a frame adjustment device, configured to adjust a three-dimensional (3D) position of the frame relative to the window based on the location of the viewer.

In certain embodiments, the 3D position of the frame is adjusted by: obtaining the viewer image by the image capturing device; identifying the location of the viewer in the viewer image; determining a new 3D position of the frame relative to the window based on the location of the viewer; and moving the frame from a current position to the new 3D position by the frame adjustment device.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 1A schematically shows an artificial window according to certain embodiment of the present disclosure.

DETAILED DESCRIPTION OF THE DISCLOSURE

Figure 1C:
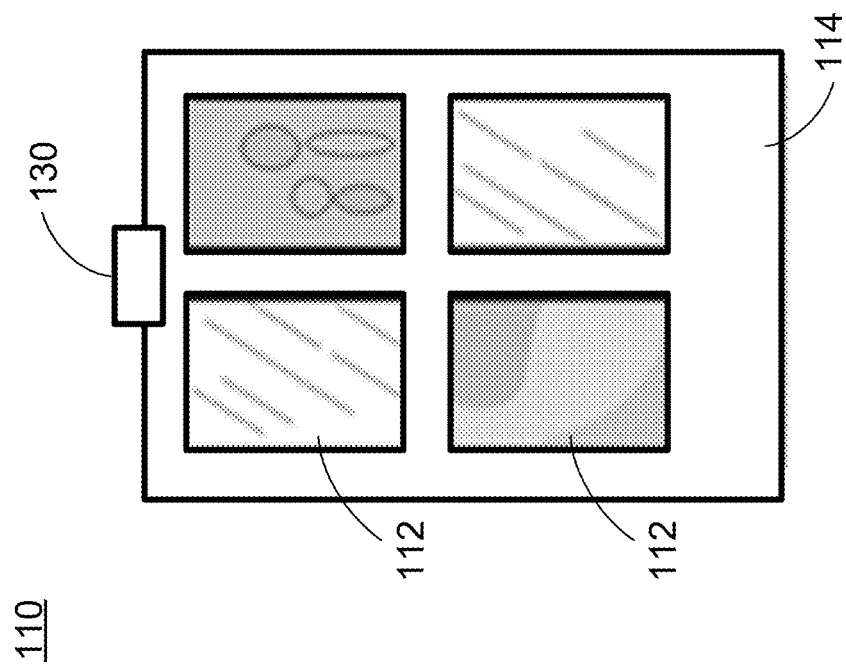
FIG. 1C schematically shows a frame and a plurality of transparent panels of the artificial window as shown in FIG. 1A according to certain embodiment of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a display panel and a display device using the same.

As discussed above, the existing artificial window does not really look realistic. Specifically, the factors or conditions to make an artificial window look realistic include, without being thereto: (a) the view of the artificial window appears from a certain distance (e.g., at least 3 m); and (b) there is some parallax effect provided by the artificial window, such that when a viewer looks toward different directions through the artificial window, the view will be different for each viewing direction. In other words, the artificial window may provide a view that appears from a certain distance and extends to both sides from the normal view.

Figure 1B:
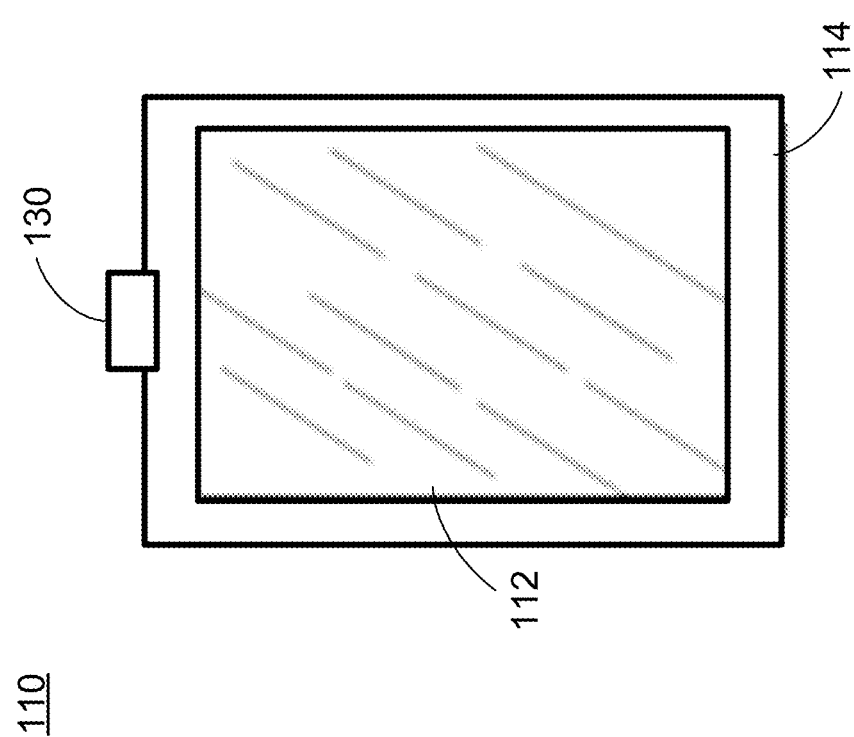
FIG. 1B schematically shows a frame and a single transparent panel of the artificial window as shown in FIG. 1A according to certain embodiment of the present disclosure.

In view of this deficiency, one aspect of the present disclosure is to provide an artificial window, which has a simple structure. For example, FIG. 1A schematically shows an artificial window according to one embodiment of the disclosure. As shown in FIG. 1A, the artificial window 100 includes a window 110, a display device 120, and an image capturing device 130. The window 110 has at least one transparent panel 112 and a frame 114. Specifically, the transparent panel 112 is framed in the frame 114. FIGS. 1B and 1C show the window 100 according to different embodiments of the present disclosure. Specifically, FIG. 1B shows a single transparent panel 112 being framed in the frame 114, and FIG. 1C shows a plurality of transparent panels 112 being framed in the frame 114. In certain embodiments, the transparent panel 112 may be a glass panel or a plastic panel, such that the window 100 looks realistic. In certain embodiments, it is also possible that the window 110 is formed only by the frame 114, without the transparent panel 112. The display device 120 can be a flat panel display device, which is disposed at a back side of the window 100 to display a plurality of images, such that a viewer 140 at a front side of the window 100 may see the image displayed by the display device 120 through the transparent panel 112 of the window 100. The image capturing device 130 is disposed on the frame 114 of the window 100 to obtain a viewer image of the viewer 140. Specifically, the image capturing device 130 may be a camera, which may be disposed on a top middle location of the frame 114. In other embodiments, the image capturing device 130 may be disposed at any other convenient location of the frame 114. A viewing direction of the viewer 140 may be determined based on the viewer image obtained by the image capturing device 130, and the images being displayed on the display device 120 are changed based on the viewing direction of the viewer 140. In certain embodiments, there are images pre-stored with multiple views to match with different possible viewer directions of the viewer 140.

Figure 2:
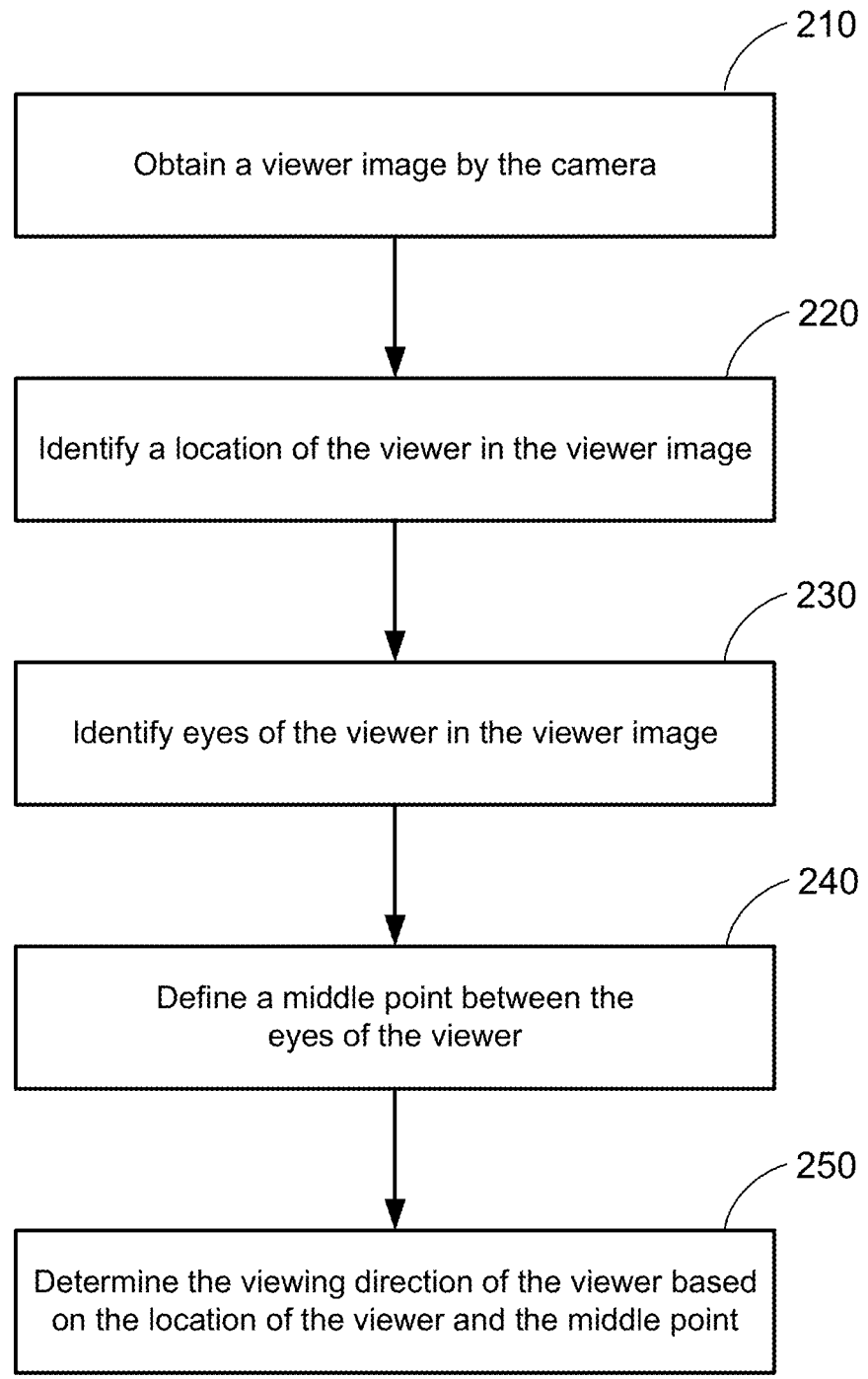
FIG. 2 shows a flowchart of a method for determining a viewing direction of a viewer of the artificial window as shown in FIG. 1A.

FIG. 2 shows a flowchart of a method for determining a viewing direction of a viewer of the artificial window as shown in FIG. 1A. Specifically, the method as shown in FIG. 2 may be performed by a computing device (not shown), which is communicatively connected to the display device 120 and the image capturing device 130. As shown in FIG. 2, in procedure 210, the viewer image is obtained by the image capturing device 130. In procedure 220, a location of the viewer 140 is identified in the viewer image. In procedure 230, the eyes of the viewer 140 are identified in the viewer image. In procedure 240, a middle point between the eyes of the viewer 140 is defined. Finally, in procedure 250, the viewing direction of the viewer is determined based on the location of the viewer and the middle point between the eyes of the viewer 140. In certain embodiments, the identification procedures in the procedures 220 and 230 may be performed using image recognition technology. Once the viewing direction of the viewer 140 is determined, the images being displayed on the display device 120 are changed based on the viewing direction of the viewer 140. For example, as the viewer 140 moves his or her head from left to right, the images being displayed on the display device 120 also sweep from left to right. In one embodiment, the movement of the images is horizontal, thus providing a simple solution for the artificial window 100. In other words, to perform the method, the computing device may be provided with a simple software, which includes translation of a bigger image and selecting a region of interest within the image to present on the display device 120. In certain embodiments, the movement of the images may be two-dimensional, which includes both horizontal and vertical movements, thus allowing vertical motion (and height movement) of the viewer 140.

As discussed above, in the artificial window 100 as shown in FIG. 1A, the images being displayed on the display device 120 are changed based on the viewing direction of the viewer 140. This is adequate and effective when only one viewer 140 exists in front of the artificial window 100, but would not be effective when multiple viewers exist in front of the artificial window 100. Further, the display device 120 has to be slightly behind the window 110, but the distance between the display device 120 and the window 110 cannot be very far.

Figure 3A:
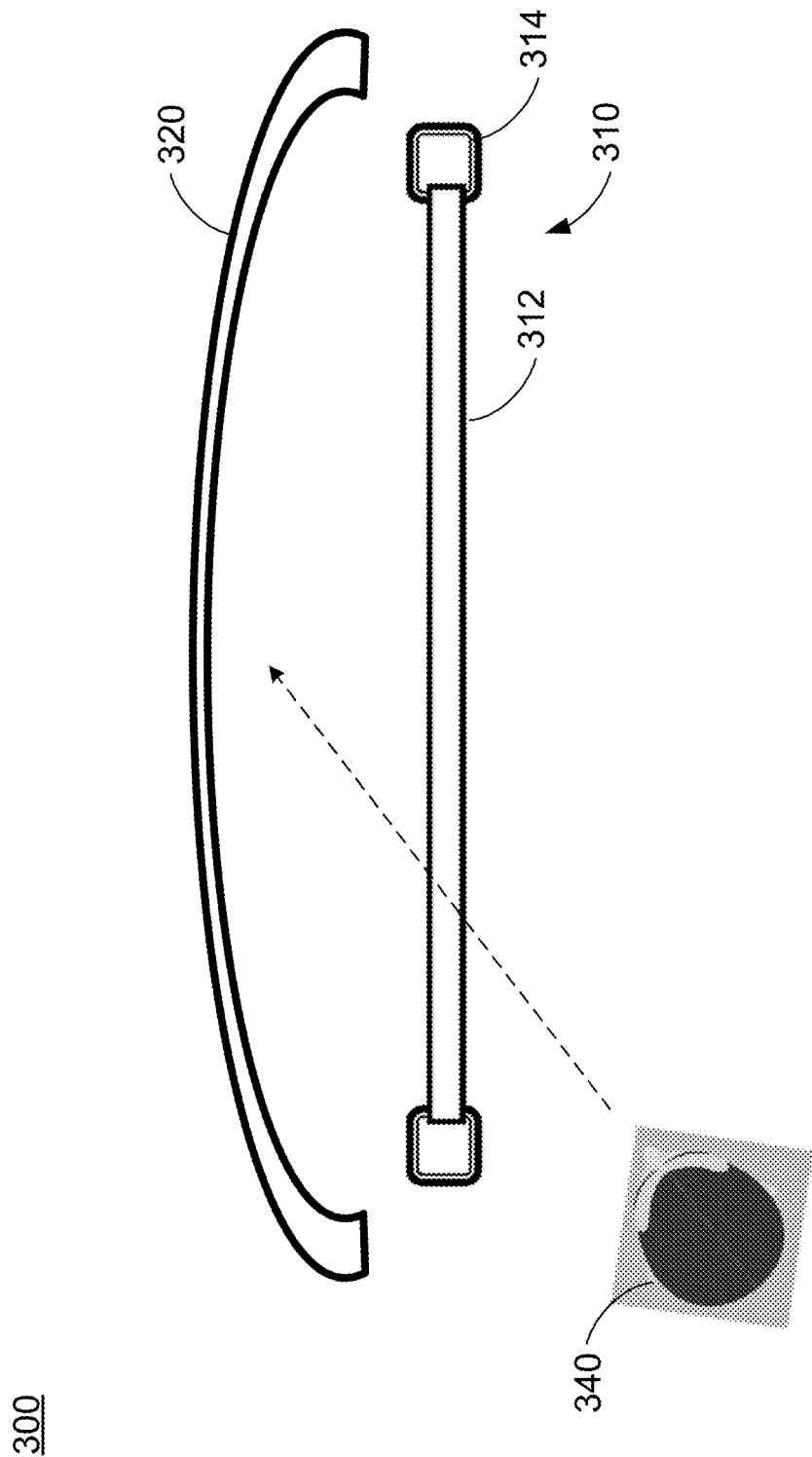
FIG. 3A schematically shows an artificial window according to certain embodiment of the present disclosure.

FIG. 3A schematically shows an artificial window according to another embodiment of the disclosure, which may be adequate for any number of viewers. As shown in FIG. 3A, the artificial window 300 includes a window 310 and a curved display device 320. The window 310 is similar to the window 110 as shown in FIG. 1A, which has at least one transparent panel 312 and a frame 314. Details of the transparent panel 312 and the frame 314 are not hereinafter elaborated. The curved display device 320 is disposed at a back side of the window 300 to display a fixed image, such that a viewer 340 at a front side of the window 300 may see the fixed image displayed by the display device 320 through the transparent panel 312 of the window 300. Specifically, the curved display device 320 is positioned at some distance behind the window 300, such that the images being displayed on the curved display device 320 appear far enough as a scenic view. Further, the curved display device 320 is horizontally wider than the frame 314 of the window 310 to cover all of the possible viewing angles of the viewer 340, such that at any viewing angle, the edge of the curved display device 320 is still viewable through the frame 314 of the window 310. The curvature of the curved display device 320 is not very tight. In other words, the radius of the curved display device 320 is relatively large.

One of the differences between the artificial window 300 as shown in FIG. 3A and the artificial window 100 as shown in FIG. 1A exists in that the curved display device 320 is used in the artificial window 300, and no image capturing device is required. The fixed image displayed by the curved display device 320 allows the effect for the viewer 340 to see the right view at different locations with different viewing directions. Thus, more than one viewer 340 may be allowed for the artificial window 300. However, since the curved display device 320 is used in the artificial window 300, the gap between the window 310 and the curved display device 320 is increased comparing to the gap between the window 110 and the flat display device 120 of the artificial window 100, thus resulting in a bigger volume for the artificial window 300.

Figure 3B:
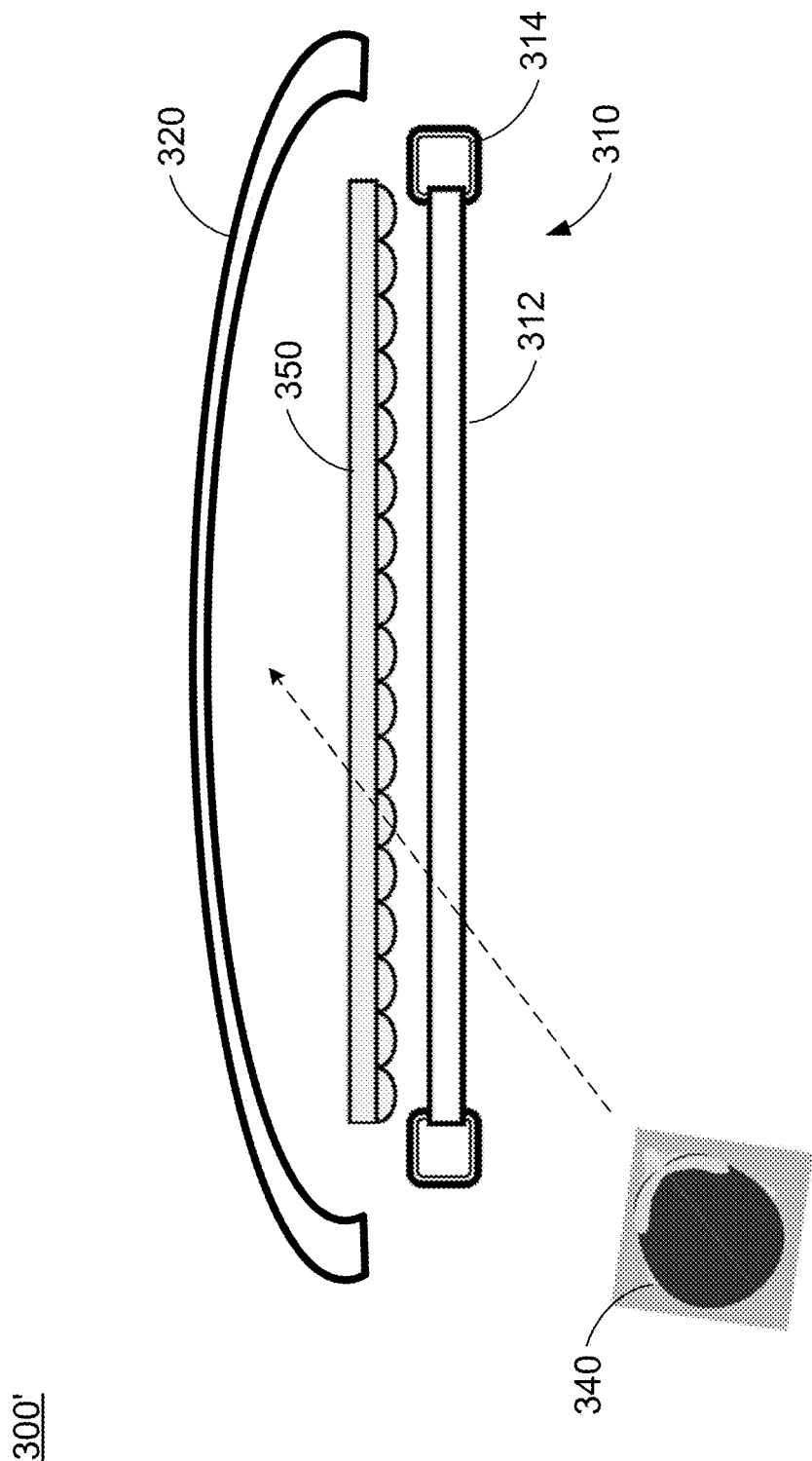
FIG. 3B schematically shows an artificial window according to certain embodiment of the present disclosure.

FIG. 3B schematically shows an artificial window according to yet another embodiment of the disclosure. Specifically, the artificial window 300' as shown in FIG. 3B is a modified embodiment of the one as shown in FIG. 3A, where the artificial window 300' further includes a plurality of lenslets 350 arranged in an array and disposed between the window 310 and the curved display device 320. Specifically, the lenslets 350 are provided as an optical element between the window 310 and the curved display device 320, and each of the lenslets 350 is focused on or close to a display surface of the curved display device 320, thus allowing the parallax effect when the distance between the window 300 and the curved display device 320 is relatively smaller. In this case, the fixed image on the curved display device 320 has to match several views in accordance with the lines of the lenslets 350, which is similar to light-field views. In one embodiment, the fixed image on the curved display device 320 may be split into multiple smaller image sections, and each image section is generated to match with a corresponding one of the lenslets 350. With the lenslets 350 being disposed between the window 310 and the curved display device 320, the gap between the window 310 and the curved display device 320 may be reduced, thus reducing the volume for the artificial window 300'. In other words, the addition of the lenslets 350 reduces the volume for the artificial window 300'. Other components of the artificial window 300', including the window 310 and the curved display device 320, are similar to those in the artificial window 300, and are thus not elaborated herein.

Figure 4:
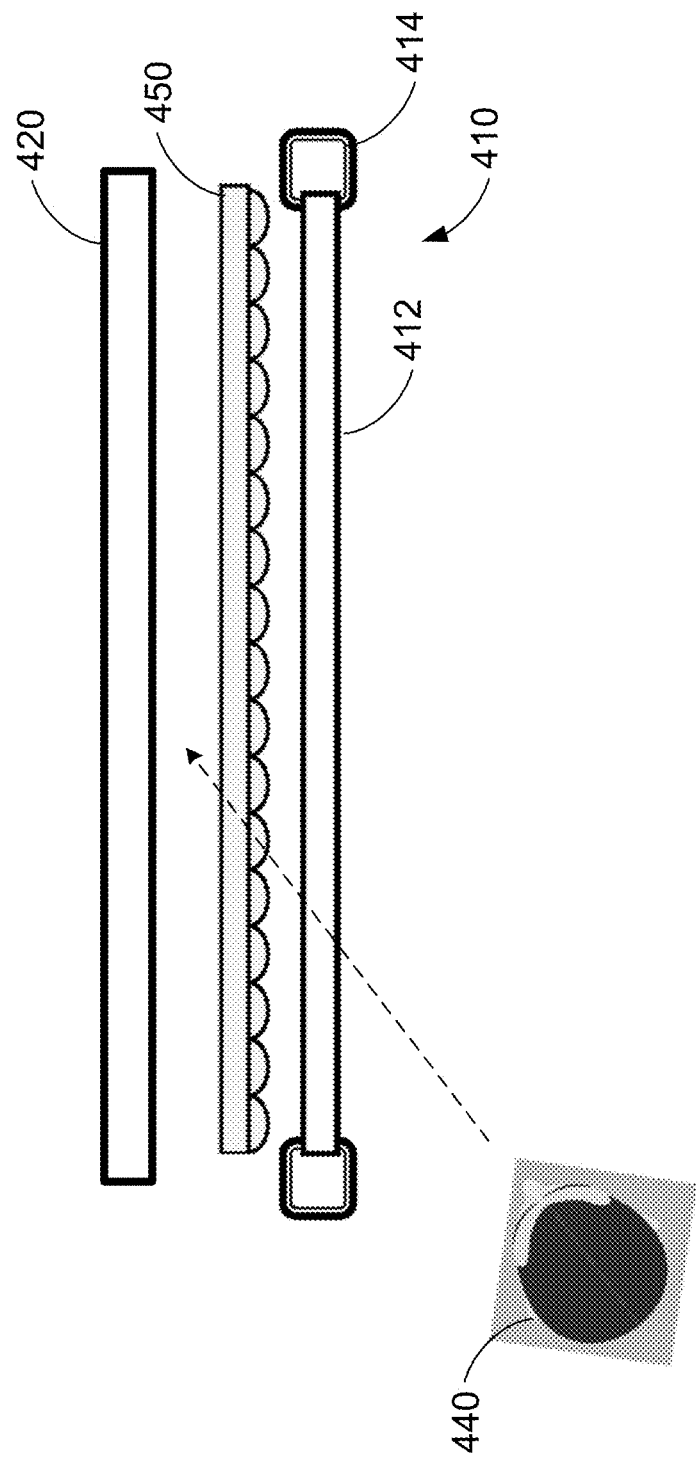
FIG. 4 schematically shows an artificial window according to certain embodiment of the present disclosure.

FIG. 4 schematically shows an artificial window according to yet another embodiment of the disclosure. Specifically, the artificial window 400 as shown in FIG. 4 includes a window 410, a flat display device 320, and a plurality of lenticular lenses 450 arranged in a lenticular array and disposed between the window 410 and the flat display device 420. The window 410 has at least one transparent panel 412 and a frame 414, and the transparent panel 412 is framed in the frame 414. The flat display device 420 is disposed at a back side of the window 100 to display a plurality of images. The lenticular lenses 450 are provided as an optical element between the window 410 and the flat display device 420, and each of the lenticular lenses 450 is focused on or close to a display surface of the flat display device 420. In other words, the flat display device 420 is used to replace the curved display device 320 in the artificial window 300', and the lenticular lenses 450 are used to replace the lenslets 350 in the artificial window 300'. With the lenticular lenses 450 being disposed between the window 410 and the flat display device 420, the gap between the window 410 and the flat display device 420 may be reduced, thus reducing the volume for the artificial window 400.

In certain embodiments, the flat display device 420 is a multi-view stereoscopic display device, and information of the images being displayed on the flat display device 420 matches a structure of the lenticular array. In other words, the images displayed on the flat display device 420 have to match the structure of the lenticular lenses 450 to provide multiple views.

In certain embodiments, the flat display device 420 as shown in FIG. 4 may be a light-field three-dimensional (3D) display device, such as an active-matrix liquid crystal display (AMLCD) device, and the images being displayed by the flat display device 420 are 3D images, which require specific computation. In one embodiment, the light-field 3D display device has a plurality of pixels in a plurality of viewing directions, and a special backlight module illuminating the pixels in each of the viewing directions. In one embodiment, the flat display device 420 is a high-resolution display device.

Figure 5:
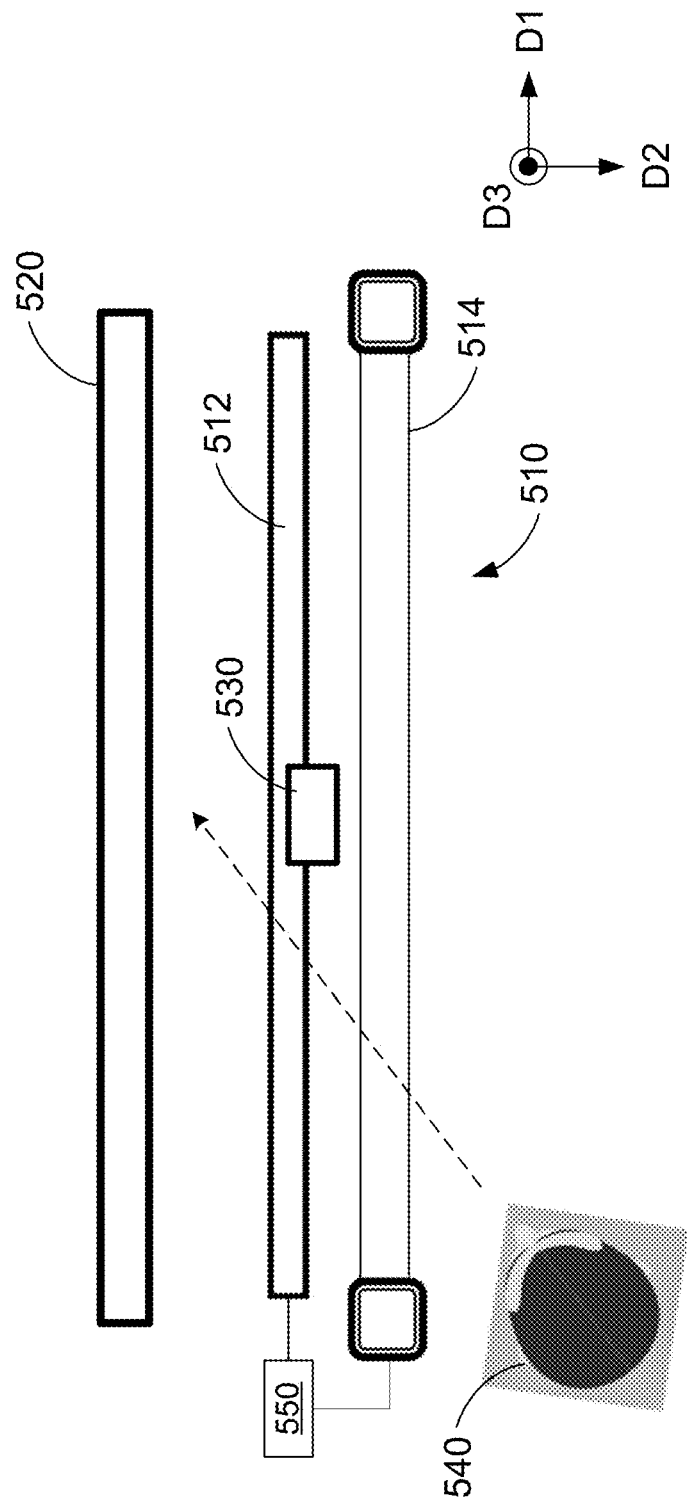
FIG. 5 schematically shows an artificial window according to certain embodiment of the present disclosure.

In certain embodiments, the different structures of the artificial window in each of the embodiments disclosed above may be further modified to improve the parallax effect of the artificial window. For example, FIG. 5 schematically shows an artificial window according to yet another embodiment of the disclosure. As shown in FIG. 5, the artificial window 500 has a similar structure to the artificial window 100 as shown in FIG. 1A, including a window 510, a display device 520 and an image capturing device 530. The difference between the artificial window 500 and the artificial window 100 exists in that the window 510 is formed to have an adjustable frame 514, which has a fixed dimension and is detachably movable relative to the transparent panel 512 of the window 510. Further, a frame adjustment device 550 is provided to adjust a three-dimensional (3D) position of the frame 514 relative to the window 510 based on a location of the viewer 540. In other words, the 3D position of the frame 514 may be adjusted by the frame adjustment device 550 such that the frame 514 moves in a horizontal direction D1, a front-rear direction D2 and/or a vertical direction D3 relative to the window 510.

Figure 6:
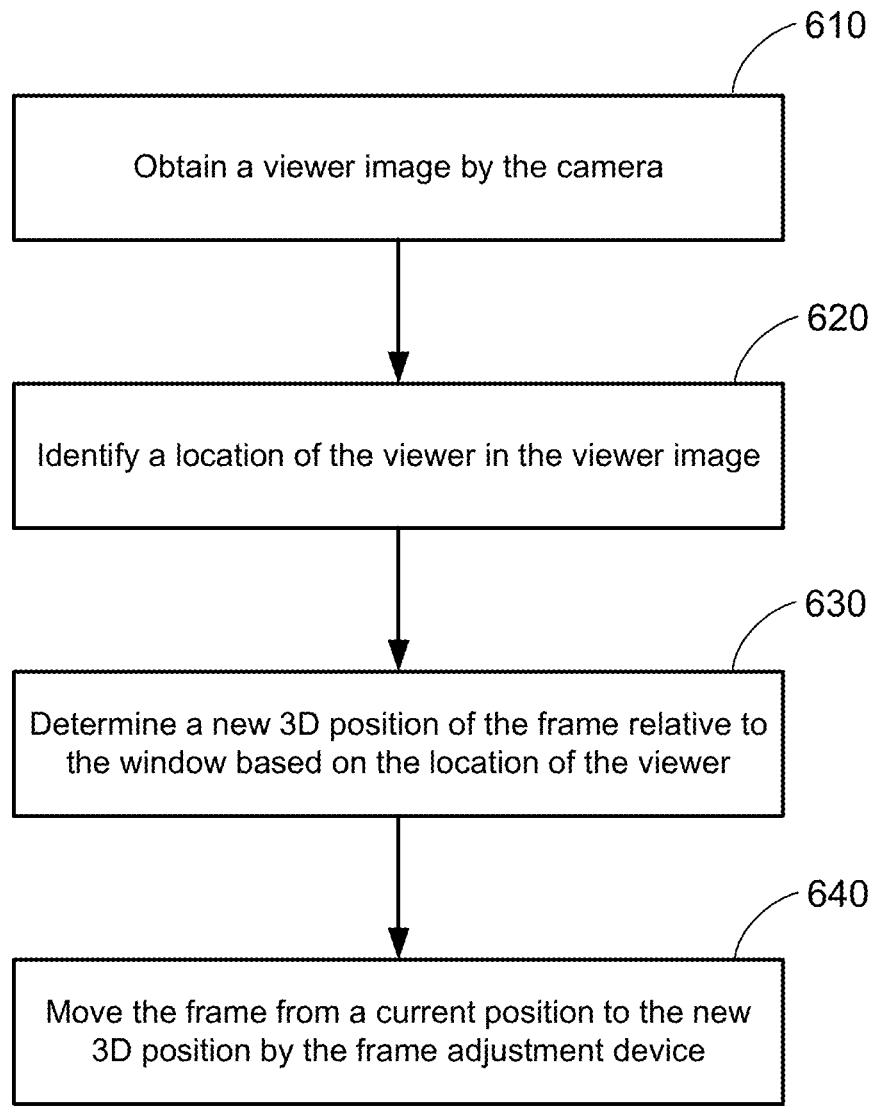
FIG. 6 shows a flowchart of a method for adjusting a 3D position of the frame of the artificial window as shown in FIG. 5.

FIG. 6 shows a flowchart of a method for adjusting a 3D position of the frame of the artificial window as shown in FIG. 5. Specifically, the method as shown in FIG. 6 may be performed by a computing device (not shown), which is communicatively connected to the image adjustment device 550 for adjusting the 3D position of the frame 514 relative to the window 510. As shown in FIG. 6, in procedure 610, the viewer image is obtained by the image capturing device 530. In procedure 620, a location of the viewer 540 is identified in the viewer image. In procedure 630, a new 3D position of the frame 514 relative to the window 510 is determined based on the location of the viewer 540. For example, when the viewer 540 is viewing the images to the right, the frame 514 may be moved to the left to provide a better parallax effect. Similarly, when the viewer 540 is viewing the images to the left, the frame 514 may be moved to the right. For images having a scenery that is close by (such as trees or a building), the frame 514 may move backward closer to the window 510. For images having a scenery that is far away (such as mountains), the frame 514 may move forward close to the viewer 540 to provide a better depth effect. Once the new 3D position of the frame 514 is determined, in procedure 640, the frame 514 is moved from a current position to the new 3D position by the frame adjustment device 550.

It should be particularly noted that, in the artificial window 500 as shown in FIG. 5, the display device 520 is similar to the display device 120 as shown in FIG. 1A. However, the window 510 having the adjustable frame 514 may be applied to the artificial windows in any of the embodiments as discussed above, without being limited thereto.

In certain embodiments, the images being displayed by the display device of the artificial window as described in the exemplary embodiments may be changed based on different factors to make the artificial window realistic. In certain embodiments, the images may be changed to match the date and time. For example, in the morning, the images may be sunrise images and then lighted scenery, and in the evening, the images may be sunset images. In certain embodiments, the images may be changed to match the weather. For example, in a sunny weather, the daytime images can be a clear sky and bright scenery, and in a cloudy weather, the images can be darker. In certain embodiments, an external photo-sensor may be added to help define the factors that may affect the determination to the images.

The artificial window as described in the exemplary embodiments may be used in different applications. For example, the artificial window may be used to provide an image from the scene outside a building or in an enclosed environment (e.g., cabins on a cruise ship, basement) without an actual window. Real windows have heat loss and increase building heating and cooling costs. In comparison, artificial windows described in this disclosure can reduce energy consumption. In certain embodiments, the energy saved using the artificial windows to replace real windows may be significant more than the energy needed to drive the display devices of the artificial windows.

In certain embodiments, the panoramic images needed for the artificial window may be obtained by cameras with fisheye type lens. In one embodiment, each image may be obtained by stitching a plurality of separate images captured by multiple cameras together. In certain embodiments, the images for the artificial window may be real time images captured by an outside camera, which is synchronized with the image capturing device (i.e., an inside camera) on the artificial window for tracking the location and/or the viewing direction of the viewer.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An artificial window, comprising:
   a window having a frame, wherein the frame is detachably movable relative to the window;
   a display device disposed at a back side of the window, configured to display a plurality of images;
   an image capturing device disposed on the window to obtain a viewer image of a viewer; and
   a frame adjustment device, wherein the frame adjustment device is configured to adjust a three-dimensional (3D) position of the frame relative to the window based on a location of the viewer,
   wherein a viewing direction of the viewer is determined based on the viewer image, and the images being displayed on the display device are changed based on the viewing direction of the viewer by identifying eyes of the viewer in the viewer image,
   wherein the viewing direction of the viewer is determined by:
   obtaining the viewer image by the image capturing device;
   identifying a location of the viewer in the viewer image;
   identifying the eyes of the viewer in the viewer image, and defining a middle point between the eyes of the viewer; and
   determining the viewing direction of the viewer based on the location of the viewer and the middle point.

2. The artificial window of claim 1, wherein the window comprises at least one transparent panel being framed in the frame.

3. The artificial window of claim 1, wherein the image capturing device is a camera disposed on a top middle location on the frame.

4. The artificial window of claim 1, wherein the 3D position of the frame is adjusted by:
   obtaining the viewer image by the image capturing device;
   identifying the location of the viewer in the viewer image;
   determining a new 3D position of the frame relative to the window based on the location of the viewer; and
   moving the frame from a current position to the new 3D position by the frame adjustment device.

5. An artificial window, comprising:
   a window having a frame;
   a curved display device disposed at a back side of the window, configured to display a fixed image, wherein the curved display device is wider than the frame;
   a plurality of lenslets arranged in an array and disposed between the window and the curved display device, wherein each of the lenslets is focused on or close to a display surface of the curved display device;
   an image capturing device disposed on the window to obtain a viewer image of a viewer, wherein a location of the viewer is determined based on the viewer image, and the frame is detachably movable relative to the window; and
   a frame adjustment device, configured to adjust a three-dimensional (3D) position of the frame relative to the window based on the location of the viewer.

6. The artificial window of claim 5, wherein the window comprises at least one transparent panel being framed in the frame.

7. The artificial window of claim 5, wherein the 3D position of the frame is adjusted by:
   obtaining the viewer image by the image capturing device;
   identifying the location of the viewer in the viewer image;
   determining a new 3D position of the frame relative to the window based on the location of the viewer; and
   moving the frame from a current position to the new 3D position by the frame adjustment device.

8. An artificial window, comprising:
   a window having a frame;
   a flat display device disposed at a back side of the window, configured to display a plurality of images, wherein the flat display device is a multi-view stereoscopic display device;
   a lenticular array formed by a plurality of lenticular lenses disposed between the window and the flat display device, wherein each of the lenticular lenses is focused on or close to a display surface of the flat display device, and information of the images being displayed on the flat display device matches a structure of the lenticular array;

an image capturing device disposed on the window to obtain a viewer image of a viewer, wherein a location of the viewer is determined based on the viewer image, and the frame is detachably movable relative to the window; and a frame adjustment device, configured to adjust a three-dimensional (3D) position of the frame relative to the window based on the location of the viewer.

9. The artificial window of claim 8, wherein the window comprises at least one transparent panel being framed in the frame.

10. The artificial window of claim 8, wherein the flat display device is a light-field three-dimensional (3D) display device, and the images being displayed by the flat display device are 3D images.

11. The artificial window of claim 10, wherein the light-field 3D display device has a plurality of pixels in a plurality of viewing directions, and a backlight module illuminating the pixels in each of the viewing directions.

12. The artificial window of claim 10, wherein the light-field 3D display device is an active-matrix liquid crystal display (AMLCD) device.

13. The artificial window of claim 8, wherein the 3D position of the frame is adjusted by:

obtaining the viewer image by the image capturing device;

identifying the location of the viewer in the viewer image;

determining a new 3D position of the frame relative to the window based on the location of the viewer; and moving the frame from a current position to the new 3D position by the frame adjustment device.

* * * * *